United States Patent Office 3,412,077
Patented Nov. 19, 1968

3,412,077
POLYMERS OF ACRYLONITRILE WITH OLEFIN-
ICALLY UNSATURATED SEMICARBAZIDE
Jenö Szita, Horst Wieden, Herbert Marzolph, Karl Hurm, and Günther Nischk, Dormagen, and Helmut Kleiner, Cologne-Riehl, Germany, assignors to Farbenfabriken Bayer Aktiengesellschaft, Leverkusen, Germany, a corporation of Germany
No Drawing. Filed July 12, 1965, Ser. No. 471,462
Claims priority, application Germany, July 16, 1964, F 43,456
13 Claims. (Cl. 260—79.3)

ABSTRACT OF THE DISCLOSURE

A novel class of copolymers and a process of preparing the same. The polymers comprise (1) at least 80% by weight of acrylonitrile and (2) 0.1 to 20% by weight of a member of the group of (a) olefinically unsaturated semicarbazide monomers having the formula:

$$R_1-X-NH-CO-NH-N\diagup^{R_2}_{\diagdown R_3}$$

wherein $R_1$ is alkenyl, X is $$-\overset{O}{\underset{\|}{C}}-O-(CH_2)_n-$$

wherein $n$ has a value of 2 to 4 and $R_2$ and $R_3$ are each lower alkyl, (b) the acid addition salts of said semicarbazide and (c) the quaternary ammonium compounds of said semicarbazide.

The above copolymers are obtained by copolymerizing acrylonitrile with said semicarbazide monomer in an aqueous medium at a pH value of 3 to 5, at a temperature of from 10 to 70° C. in the presence of a redox catalyst system.

---

The invention relates to a new class of copolymers of acrylonitrile and to a process for the production of acrylonitrile copolymers with improved properties.

It is known that acrylonitrile can be polymerized in aqueous media at an acidic pH, either by itself or in admixture with other polymerizable monomers, with the aid of Redox catalyst systems. The resulting polymers may be molded by known processes to form filaments and films. Unfortunately, the affinity of such products for the conventional dyes is not sufficient to obtain practically useful or dark shades. The reason for this lies in the absence of or in a deficiency of dye-receptive groups in the polymer. For this reason, attempts have frequently been made to render the polymer receptive to basic (cationic) or acidic (anionic) dyes by copolymerizing it with compounds containing acidic or basic groups, for example styrene sulphonic acid or vinyl pyridine.

Due, however, to the sensitivity of acrylic polymers to basic compounds, which is shown by a marked tendency towards yellowing under the influence of heat, severe restrictions are imposed on the type and quantity of basic comonomers which can be used. In instances where basic co-components containing secondary or tertiary amino groups are used, further difficulties occur during polymerization if, as is usually the case, a Redox system containing peroxide compounds or if these compounds alone are used as initiators. This is because the aforementioned co-components participate in the initiating and terminating reaction, with the result that the polymerization velocity and the molecular weight are very considerably reduced. Such polymers contain basic terminal groups which further increase the already mentioned tendency towards yellowing. Polymerization is also greatly affected by the presence of oxygen so that polymerization does not usually take place at all in the presence of air.

It is, therefore, an object of this invention to provide a copolymer comprised of at least 80 percent of acrylonitrile and an olefinically unsaturated semicarbazide, the salts and the quaternary ammonium compounds thereof, said semicarbazide having the formula:

$$R_1-X-NH-CO-NH-N\diagup^{R_2}_{\diagdown R_3}$$

wherein $R_1$ represents an alkenyl radical, X represents the radical $$-\overset{O}{\underset{\|}{C}}-O-(CH_2)_n-$$

in which $n=2$ to 4, and $R_2$ and $R_3$ each represent alkyl radicals or, together with the nitrogen atom, form a ring which may also contain other hetero atoms.

A further object is to provide a process for preparing acrylonitrile copolymers which exhibit a high affinity both for acidic dyes and for basic dyes. This process comprises copolymerizing olefinically unsaturated semicarbazides, their salts or their quaternary ammonium compounds, with acrylonitrile, optionally together with other monomers. One particular advantage of this process is that acrylonitrile copolymers can be obtained which have a high content of basic co-component and exhibit a correspondingly high affinity for acidic dyes and a surprisingly high degree of whiteness, and are stable with respect both to thermal and to oxidizing influences. In addition, the polymerization reaction is not detrimentally affected by the addition of the basic co-components according to the invention, with the result that high polymerization velocities and yields are obtained.

The olefinically unsaturated semicarbazides have the following general formula:

$$R_1-X-NH-CO-NH-N\diagup^{R_2}_{\diagdown R_3}$$

wherein $R_1$ represents an alkenyl radical, X represents the radical $$-\overset{O}{\underset{\|}{C}}-O-(CH_2)_n-$$

in which $n=2$ to 4, and $R_2$ and $R_3$ each represent alkyl radicals or, together with the nitrogen atom, form a ring which may also contain other hetero atoms.

The semicarbazide compounds may be obtained, for example from the corresponding N,N-disubstituted hydrazines by reaction with an unsaturated carboxylic acid —ω—isocyanatoalkyl ester, such as β-isocyanatoethyl acrylate or methacrylate.

The olefinically unsaturated quaternary ammonium compounds would then have the formula $$\left[R_1-X-CO-NH-\overset{R_2}{\underset{\underset{R_3}{|}}{\overset{|}{\overset{\oplus}{N}}}}-R_4\right] Y^\ominus$$

wherein $R_1$, $R_2$, $R_3$ and X have the meanings defined above and $R_4$ represents hydrogen or an alkyl radical and Y represents an inorganic or organic acid radical.

The olefinically unsaturated quaternary ammonium compounds of this type may be prepared by reacting unsaturated N,N-disubstituted semicarbazides with organic esters of inorganic acids, for example sulphuric acid, at temperatures in the range from 0 to 150° C., optionally in an organic solvent.

The following compounds may, for example, be used as the olefinically unsaturated semicarbazides, their salts and their quaternary ammonium compounds:

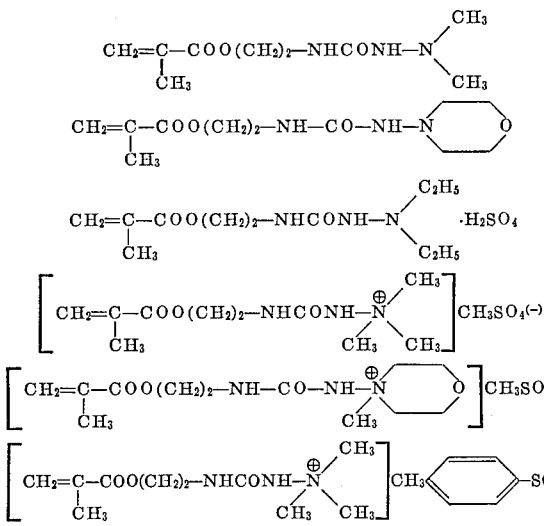

The semicarbazide content of the acrylonitrile copolymer may vary within wide limits. Quantities varying from 0.1 to 20% by weight, based on the total amount of monomer, are preferred.

The greater part, and at least 80% by weight, of the polymers according to the invention are intended to consist of acrylonitrile. Apart from the unsaturated semicarbazides, however, other copolymerizable monomers may also be used, for example, acrylates and methacrylates, vinyl acetate, vinyl chloride, vinylidene chloride, styrene, acrylamide and styrene sulphonic acid.

These polymers contain preferably 0.1 to 19.9% by weight of said ethylenically unsaturated monomer and 0.1 to 19.9% by weight of said semicarbazide monomer.

In general, the polymer preferably contains 300 to 500 milliequivalents of basic groups per kg. of polymer. In special cases, however, it may contain considerably larger amounts.

When polymerization is carried out, the affinity of the polymers for dyes may also be varied in accordince with the type and amount of catalysts used. The terminal sulphate or sulphonic acid groups incorporated during the formation of the macromolecules are known to possess an affinity for cationic dyes. The terminal group content is therefore variable with the polymolecularity of the polymers and their K-values. Thus, in cases where catalysts yielding the aforementioned terminal acid groups are used, for example, a redox system consisting of persulphate/bisulphite, a wide range of possibilities is obtained for varying the affinity of the polymers for basic dyes. Since no terminal basic groups are formed during the copolymerization of the basic co-components according to the invention, there also remains an affinity for basic dyes which is dependent upon the number of acid terminal groups (up to 60 milliequivalents of acid groups per kg. of polymer). In this case, polymerization is carried out in the usual way. Water added in a quantity 5 to 10 times larger that that of the monomers, is used as the polymerization medium. Polymerization is carried out at temperatures from +10 to +70° C., and preferably at +40 to +60° C. The pH-value of the polymerization medium is from 3 to 5, preferably from 4 to 4.5. It is adjusted to the required value by means of strong inorganic acids, such as sulphuric acid or phosphoric acid. Mixtures of different acids as well as strong organic acids, for example, aryl sulphonic acids, may in some instances be used to advantage.

Compounds which can form free radicals are suitable for use as the polymerization catalysts. Examples of such compounds are hydrogen peroxide, persulphates and hydroperoxides. It is generally preferred to use redox systems, particularly those based upon peroxy compounds and compounds of sulphur in a low oxidation stage. Suitable peroxy compounds include the alkali metal and ammonium salts of persulphuric acid and perphosphoric acid or hydrogen peroxide. Suitable compounds of sulphur in a low oxidation stage include the alkali metal or ammonium salts of pyrosulphurous acid or of thiosulphuric acid. The per compounds are used in quantities of from 0.3 to 3% by weight, based on the polymerizable monomers, and the redcing agents in quantities of from 0.3 to 6% by weight. In many instances, heavy metal compounds used in small quantities have proved to be effective accelerators.

In addition to the salts used as redox catalysts, suitable neutral salts, usch as alkali metal sulphates and phosphates, may be present in the polymerization mixture. If desired, polymerization regulators such as aliphatic mercaptans, optionally those containing a hydroxyl group near the sulphydryl group, for example, thioglycol, may also be used in the process according to the invention.

The copolymerization of unsaturated semicarbazides with acrylonitrile and optionally with other vinyl compounds may be carried out continuously or batchwise. In this way, it is possible, by modifying the polymolecularity of the copolymer, to vary within wide limits the number of dye-receptive terminal groups and hence the affinity for basic dyes. Providing suitable catalysts are used, copolymerization proceeds smoothly and, after short reaction times, high yields of polymers with the relaively high molecular weights required for the production of fibers are obtained. The copolymers which accumulate in a fine-grained form may satisfactorily be further processed (e.g. by filtration or drying). They are readily soluble in the conventional solvents for acrylic polymers such as dimethyl formamide, dimethyl acetamide, dimethyl sulphoxy or butyrolactone, and spinning solutions with a high polymer concentration can be prepared.

The moldings, foils, films, filaments and fibres produced from the copolymers according to the invention may be readily dyed in very deep shades and remain resistant both to sunlight and washing. In addition, fibres prepared from these copolymers exhibit a very light natural tone, with the result that often they do not have to be additionally bleached. Additional valuable properties of these fibres are their high thermostability and their resistance to other discoloring influences such as the action of alkalis and oxygen. Even with a relatively high semicarbazide content, fibres and filaments prepared from the copolymers according to the invention exhibit outstanding physical properties.

In the following examples which are merely illustrative, and throughout the specification, parts and percentages represent parts by weight and percentages by weight, respectively, based on the total quantities, unless otherwise indicated.

Example 1

900 parts of demineralized water are acidified with sulphuric acid to pH 4, poured into a suitable reaction vessel from which air is displaced by introducing nitrogen, and heated to 55° C. 3.7 parts of an unsaturated semicarbazide of the formula:

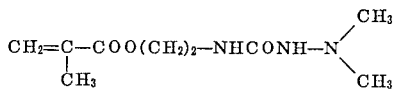

and 70 parts of acrylonitrile are then added, and the mixture is stirred until a solution is obtained. The clear reaction mixture is then mixed with 0.4 part of potassium persulphate and 0.8 part of sodium pyrosulphite. It becomes turbid after 20 to 30 seconds, showing that polymerization has started. The reaction mixture is stirred for 4 hours at 50° C. under a protective nitrogen pressure (5 to 10 mm./Hg). The precipitated, fine-grained polymer is isolated by filtration, washed free from acid with demineralized water and dried in vacuo at 60 to 70° C. The resulting copolymer has a K-value of 92.5 (according to Fikentscher, Cellulosechemie, 13, p. 58 (1932)); yield 85% by weight.

Further copolymerization tests were carried out using other semicarbazide co-components in different proportions and acrylonitrile. The monomers and the proportions in which they are used, the different quantities in which the catalysts and activators are used, the acids used, the pH-values and the results are given in the following Table 1.

TABLE 1

| Test No. | Co-component Name[1] | Co-component Amount, percent by wt. | Mol, percent | $K_2S_2O_8$, percent | Catalyst $Na_2S_2O_5$, percent | System acid[1] | pH | Conversion, percent | K-value |
|---|---|---|---|---|---|---|---|---|---|
| 1 | I | 3 | 1.0 | 0.70 | 1.40 | S | 4 | 88 | 83.0 |
| 2 | I | 5 | 1.7 | 0.55 | 1.10 | S | 4 | 85 | 84.2 |
| 3 | I | 8 | 2.7 | 0.50 | 1.00 | TS | 4 | 82 | 86.0 |
| 4 | I / AME | 5 / 4 | 1.7 / 3.4 | 0.55 | 1.10 | TS | 4 | 83 | 86.2 |
| 5 | I / AME | 7 / 4 | 2.4 / 3.4 | 0.52 | 1.04 | TS | 4 | 87 | 82.9 |
| 6 | I / AME | 8 / 4 | 2.7 / 3.4 | 0.50 | 1.00 | TS | 4 | 81 | 85.8 |
| 7 | I / AME | 10 / 4 | 3.4 / 3.4 | 0.45 | 0.90 | TS | 4–4,5 | 78 | 86.7 |
| 8 | II | 8 | 2.3 | 0.54 | 1.08 | TS | 4–4,5 | 92 | 87.0 |
| 9 | II / AME | 8 / 4 | 2.3 / 3.4 | 0.60 | 1.20 | TS | 4–4,5 | 93 | 88.4 |
| 10 | III / AME | 8 / 4 | 1.7 / 3.4 | 0.50 | 1.00 | ---- | 4,5 | 87 | 83.7 |
| 11 | IV / AME | 8 / 4 | 1.7 / 3.4 | 0.45 | 0.90 | S | 4 | 74 | 82.5 |
| 12 | V / AME | 8 / 4 | 1.55 / 3.4 | 0.45 | 0.45 | TS | 4 | | 80.1 |
| 13[2] | 4-VP | 5 | 3.45 | 0.45 | 0.90 | TS | 4–4,5 | 36 | 81.3 |
| 14[2] | | | | 0.80 | 2.40 | TS | 4 | 81 | 84.5 |
| 15[2] | AME | 5 | 4.2 | 0.85 | 2.55 | TS | 4 | 85 | 86.3 |

[1] Abbreviations: I to V=the formulae of the co-components as given in column 3; AME=methyl acrylate; 4-VP=4-vinyl pyridine; S=sulphuric acid; TS=toluene sulphonic acid.
[2] Comparison test.

Example 2

In order to measure the discoloration of the polymers in dimethyl formamide solution at fairly high temperatures, the following tests were carried out: 5% solutions were tempered at 80° C. in the presence if air. Samples were taken after 2, 4 and 20 hours and their extinction coefficients were measured with an electrophotometer (Type Elko III manufactured by Zeiss) at 450μ wave length. A 5 cm. cell and pure dimethyl formamide as the comparison solution were used for measurement. The values measured are given in Table 2.

TABLE 2

| Test No. | Extinction·100 after, hours— 2 | 4 | 20 |
|---|---|---|---|
| 1 | 19 | 27 | 61 |
| 2 | 14 | 23 | 46 |
| 3 | 16 | 24 | 53 |
| 4 | 13 | 21 | 41 |
| 5 | 9 | 19 | 58 |
| 6 | 10 | 16 | 38 |
| 7 | 17 | 23 | 51 |
| 8 | 28 | 36 | 65 |
| 9 | 22 | 32 | 60 |
| 10 | 16 | 25 | 52 |
| 11 | 27 | 38 | 66 |
| 12 | 29 | 42 | 70 |
| 13 | 257 | 269 | 283 |
| 14 | 42 | 67 | 97 |
| 15 | 38 | 61 | 88 |

Example 3

The copolymers according to the invention prepared in accordance with Example 1 contain basic groups which may be precisely determined by potentiometric titration. Measurement comprises dispersing 0.3 to 0.5 g. of copolymer in 20 ml. of nitromethane, and adding 2 ml. of 98% formic acid. Heating produces a clear solution which is then diluted with 50 ml. of colt nitromethane. Potentiometric titration is carried out with a 0.05 m. solution of $HClO_4$ in dioxan. It is followed by a blank run. The measured values (milliequivalents of basic groups per g. of polymer) are given in Table 3 at the end of the next example.

Example 4

The following processes were used to form and dye the copolymers:

The polymers were dissolved in dimethyl formamide (18% solutions) and films of equal thickness were cast from the resulting solutions. After 18 hours of drying in a through-circulation drying cabinet at 50 to 60° C., the films are washed free from solvent with warm water and then dried. The films thus prepared were dyed with an acidic dye (Acilandirektblau A, Color Index 2nd ed. No. 1264; vol. I) and with a basic dye (Astrazonblau B, Color Index 2nd ed., No. 421,140; vol. III). Dyeing was carried out as follows:

(a) Basic: 100 ml. of Astrazonblau B (1 g./l.), 2 ml. of acetic acid (30 g./l.) 0.3 ml. of sodium acetate (40 g./l.).

The dye is dissolved in boiling water, filtered and metered hot. 1 g. of film is added at a dyeing bath temperature of 80° C., and is dyed for one hour after the boiling temperature has been reached.

(b) Acid: 100 ml. of Acilandirektblau A (1 g./l.), 0.8 ml. of sulphuric acid (100 g./l.).

The dye does not have to be dissolved hot. Dyeing was carried out as in (a). The dyed films were washed thoroughly with water and dried.

In order quantitatively to measure the amount of dye absorved, the dyed films were carefully dissolved in dimethyl formamide. Measurement was made with a spectral photometer and a calibration curve. Table 3 shows the measurement results (g. dye/g. film).

TABLE 3

| Test No. | Milliequivalents of basic groups per 100 g. of polymer | (g. dye/g. film) × 100 Acilandirektblau A (acidic) | Astrazonblau B (basic) |
|---|---|---|---|
| 1 | 19 | 2.0 | 0.68 |
| 2 | 30 | 3.6 | 0.85 |
| 3 | 46 | 6.1 | 0.84 |
| 4 | 29 | 4.2 | 0.97 |
| 5 | 41 | 6.0 | 1.13 |
| 6 | 47 | 6.9 | 1.10 |
| 7 | 60 | 8.5 | 1.24 |
| 8 | | 1.2 | 0.81 |
| 9 | | 1.5 | 0.94 |
| 10 | 31 | 3.9 | 1.18 |
| 11 | 21 | 2.3 | 0.48 |
| 12 | | 2.7 | 0.65 |
| 13 | 63 | 9.2 | 0.05 |
| 14 | | <0.05 | 0.27 |
| 15 | | <0.05 | 0.46 |

Example 5

A copolymer according to the invention with 0.45 milliequivalents of basic groups per g. of polymer and a K-value of 85, was dissolved in dimethyl mormamide at 70° C. After filtration, the pale yellow and homogenous 27% solution was spun in the usual way by the dry spinning process. The resulting filaments were then stretched in boiling water to 3.5 times their original length, dried in the stretched condition and tempered for ten minutes at 120° C. The filaments had a thickness of 3 den. They had a natural tone with a considerably higher degree of whiteness than filaments prepared in the same way from acrylonitrile homopolymer or from a copolymer containing 5% of methyl methacrylate.

When the filaments were tempered for another hour in hot air at 160° C. to determine their tendency towards yellowing under the influence of heat, it was found that the copolymers according to the invention exhibit an unusually high thermostability compared to other basic acrylonitrile copolymers. Treatment such as this produced only a slight discoloration of the filaments whilst filaments prepared from a vinyl pyridine copolymer containing the same amount of basic groups turned brown.

Dye-absorption tests (as described in Example 5) showed that the copolymer filaments can be readily dyed deep and luminous shades with acid dyes. Unmodified acrylic filaments can only be dyed pale shades. The affinity for basic dyes is much higher than that of unmodified acrylic filaments, and is more than adequate for practical purposes. In contrast, filaments containing vinyl pyridine absorb hardly any basic dye.

What we claim is:

1. An acrylonitrile polymer comprising at least 80% by weight of acrylonitrile and 0.1 to 20% by weight of a polymerizable olefinically unsaturated semicarbazide monomer having the formula:

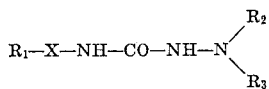

wherein $R_1$ is a member selected from the group consisting of $$CH_2=CH- \text{ and } CH_2=C- \atop CH_3$$

X is

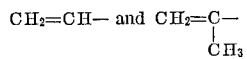

in which $n$ is an integer from 2 to 4 and $R_2$ and $R_3$ are each a member selected from the group consisting of methyl and ethyl, $R_2$ and $R_3$ when taken together with the adjacent nitrogen atom form a ring, the salts of said semicarbazide with acids and the quaternary ammonium compounds of said semicarbazide.

2. An acrylonitrile copolymer according to claim 1 additionally containing a further copolymerizable monomer.

3. An acrylonitrile copolymer according to claim 2, wherein said additional monomer is a member selected from the group consisting of acrylates, methacrylates, vinyl acetate, vinylchloride, vinylidenechloride, styrene, acrylamide, and styrene sulfonic acid.

4. An acrylonitrile polymer according to claim 2 containing from about 0.1 to 19.9% by weight of said semicarbazide monomer and from about 0.1 to 19.9% by weight of said additional copolymerizable monomer.

5. An acrylonitrile polymer according to claim 1, wherein said olefinically unsaturated hemicarbazide monomer is

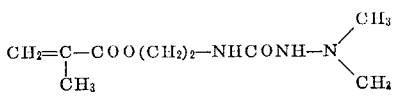

6. An acrylonitrile polymer according to claim 1, wherein said olefinically unsaturated semicarbazide monomer is

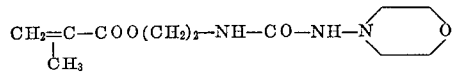

7. An acrylonitrile polymer according to claim 1, wherein said olefinically unsaturated semicarbazide monomer is

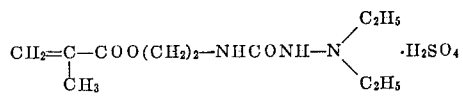

8. An acrylonitrile polymer according to claim 1, wherein said olefinically unsaturated semicarbazide monomer is

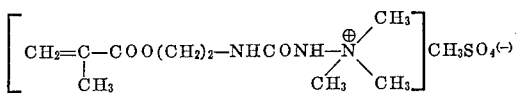

9. An acrylonitrile polymer according to claim 1, wherein said olefinically unsaturated semicarbazide monomer is

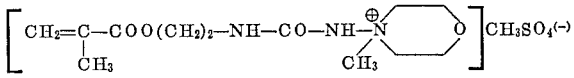

10. An acrylonitrile polymer according to claim 1, wherein said olefinically unsaturated semicarbazide monomer is

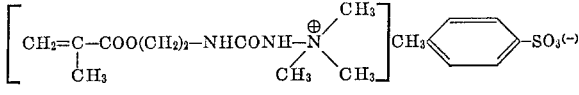

11. The copolymer of claim 1 in the form of a filament.

12. A process for preparing an acrylonitrile copolymer containing at least 80% by weight of acrylonitrile, which comprises copolymerizing acrylonitrile with a member selected from the group consisting of olefinically unsaturated semicarbazide monomers, having the formula:

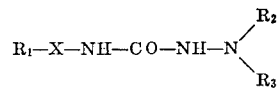

wherein $R_1$ is a member selected from the group consisting of $$CH_2=CH- \text{ and } CH_2=C- \atop CH_3$$

X is

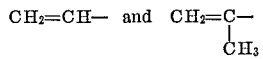

in which $n$ is an integer of from 2 to 4 and $R_2$ and $R_3$ are each a member selected from the group consisting of methyl and ethyl, $R_2$ and $R_3$ when taken together with the adjacent nitrogen atom form a ring, the salts of said semicarbazides with acids and the quaternary ammonium compounds of said semicarbazides in an aqueous medium at a pH value of from 3 to 5, at a temperature of from 10 to 70° C., in the presence of a Redox catalyst system, said olefinically unsaturated semicarbazide being present in an amount of from 0.1 to 20% by weight referred to the total amount of monomer.

13. The process of claim 12, wherein said olefinically unsaturated semicarbazide is a quaternary ammonium compound of the formula:

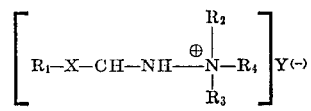

wherein $R_1$ is a member selected from the group consisting of

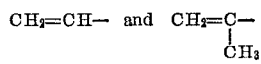

X is

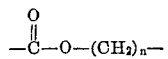

in which $n$ is an integer from 2 to 4 and $R_2$ and $R_3$ are each a member selected from the group consisting of methyl and ethyl, $R_2$ and $R_3$ when taken together with the adjacent nitrogen atom form a ring, $R_4$ is a member selected from the group consisting of hydrogen and alkyl and Y is a member selected from the group consisting of inorganic and organic anions.

No references cited.

JOSEPH L. SCHOFER, *Primary Examiner.*

HARRY WONG, JR., *Assistant Examiner.*

UNITED STATES PATENT OFFICE
CERTIFICATE OF CORRECTION

Patent No. 3,412,077                          November 19, 1968

Jenö Szita et al.

It is certified that error appears in the above identified patent and that said Letters Patent are hereby corrected as shown below:

Columns 5 and 6, TABLE 1, ninth column, line 12 thereof, insert -- 72 --. Column 6, line 39, "421,140" should read -- 42140 --. Column 7, lines 72 to 75, that portion of the formula reading

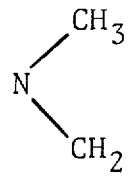 should read 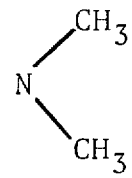

Signed and sealed this 17th day of March 1970.

(SEAL)
Attest:

EDWARD M. FLETCHER, JR.                  WILLIAM E. SCHUYLER, JR
Attesting Officer                              Commissioner of Patents